(12) United States Patent
Lin

(10) Patent No.: US 8,272,698 B2
(45) Date of Patent: Sep. 25, 2012

(54) WHEEL SPINDLE STRUCTURE OF BICYCLE

(76) Inventor: Chai-Chen Lin, Tainan (TW)

( * ) Notice: Subject to any disclaimer, the term of this patent is extended or adjusted under 35 U.S.C. 154(b) by 249 days.

(21) Appl. No.: 12/591,521

(22) Filed: Nov. 23, 2009

(65) Prior Publication Data

US 2011/0121638 A1    May 26, 2011

(51) Int. Cl.
*B60B 27/00*   (2006.01)
(52) U.S. Cl. .................... 301/124.2; 280/279
(58) Field of Classification Search ............ 301/124.2; 280/279
See application file for complete search history.

(56) References Cited

U.S. PATENT DOCUMENTS

| | | | | |
|---|---|---|---|---|
| 4,632,415 A | * | 12/1986 | San Hai | 280/279 |
| 5,281,003 A | * | 1/1994 | Herman | 301/2.5 |
| 5,531,510 A | * | 7/1996 | Yamane | 301/110.5 |
| 5,549,315 A | * | 8/1996 | Ashman | 280/279 |
| 5,630,652 A | * | 5/1997 | Cech | 301/5.306 |
| 6,089,675 A | * | 7/2000 | Schlanger | 301/124.2 |
| 6,425,642 B1 | * | 7/2002 | Huber | 301/124.2 |
| 7,494,145 B2 | * | 2/2009 | Schroeder et al. | 280/276 |
| 2008/0157586 A1 | * | 7/2008 | Montague et al. | 301/124.2 |
| 2008/0185908 A1 | * | 8/2008 | Hara | 301/124.2 |

* cited by examiner

*Primary Examiner* — Jason Bellinger
(74) *Attorney, Agent, or Firm* — Rosenberg, Klein & Lee

(57) ABSTRACT

This invention relates to a wheel spindle structure of a bicycle, in which a wheel spindle is inserted in a wheel hub so as to fix the wheel body. The wheel spindle, made of rigid titanium alloy, is cut to have a plurality of recessed grooves provided around the circumference extending along the axial direction. By providing the recessed grooves, rigidity of the wheel spindle is reduced so as to increase its elasticity. This results in high elastic force with slight elongation-contraction, whereby the wheel body can roll to move smoothly so as to remarkably increase the steering capability of the bicycle.

7 Claims, 9 Drawing Sheets

WHEEL SPINDLE STRUCTURE OF BICYCLE

BACKGROUND OF THE INVENTION

1. Field of the Invention

The present invention relates to a wheel spindle structure of a bicycle, more particularly to a wheel spindle structure of a bicycle having a design of high elastic force with slight elongation-contraction, which is obtained by providing a plurality of recessed grooves on the circumference and along the axial direction. In this way, the above function can be achieved and the steering capability of the bicycle is improved.

2. Brief Description of the Prior Art

Accompanying surging of oil prices, bicycle riding is booming in Taiwan, and some trends of thought such as EV, energy saving, healthy, and LOHAS are also becoming popular all over the island. The leisure activity of bicycle riding, which is suitable not only for both old and young but also for both sexes, has appropriately become a predominant activity. More and more cycling white-collar workers are apparently appeared on the city streets, while outstanding bicycle industries in Taiwan cooperate with local city or county governments actively to hold cycling free and unfettered trip or cycling challenge contest. That is to say, bicycle recreation is widespread to everywhere as if it is becoming a sport of whole people. No matter whether bicycles are used in leisure or transportation or contest, the bicycle industry considers it their own mission to unceasingly improve each bicycle part so as to make the bicycle become even better and better in its function.

It has been about 100 years since the first bicycle was developed, and the basic configuration of a typical bicycle has changed little. However, bicycle structure in the design of prior art does not keep up with the development of modern materials, as suitable materials should be adapted to suitable application. Generally, the frictional resistance, i.e., the rolling resistance produced by the rotation of wheel contacted with ground is different for different type of wheel used. The other factors affecting the magnitude of frictional resistance include such conditions as pneumatic pressure in wheel, tension of spokes, rigidity of wheel rim. The tire basically has a circular configuration, but the rotation of the tire produces vibration phenomena of cyclic bent-in and bent-out arisen from the weight of the bicycle and the rider, when the tire is contacted with ground. The vibration phenomena is more or less different depending on the difference in front fork, frame structure and materials, and resonance is even produced. To reduce the production of resonance, to buffer the front fork and the rear fork, and to improve the geometric displacement caused by the weight in movement can make the movement and steering of bicycle become smoother.

Recently, the bicycle structure has had the appeal of high elasticity, such as the utilization of aluminum alloy and carbon fiber in bicycle parts are also without exception. In dynamic condition, the parts in a bicycle structure should be well coordinated among one another. Hence, as the elasticity between associated parts should also be well coordinated, the wheel spindle having high elasticity with slight elongation-contraction is thus proposed. This wheel spindle can remarkably increase steering capability of the bicycle and reduce rolling resistance in moving according to the inference derived from Karman's principle in that the two fork openings of the front and the rear forks change their center point of circle due to such factors as elongation-contraction or structural bending arisen from the action of different forces. Hence, the fork openings at both ends might have different deformation routes, as the front and rear forks of the bicycle frame nowadays no longer have "absolute rigidity, which means non-deformable even a little under the action of force."

Seeing that combining the wheel hub and wheel body of a conventional bicycle has the shortcomings of large frictional resistance after assembly, large vibration force and overlarge rigidity strength, unsmoothness of the wheel body's rolling, or bad steering capability, the inventor of the present invention hereby proposes a wheel spindle, which is made according to Karman's principle by incorporating multiple physical effects, based on his proficient experience and knowledge in R&D and manufacturing in the relevant field such that the purpose of remarkably increasing steering capability of the bicycle and reducing rolling resistance is effectively achieved. Moreover, quick detachment of the combination of the wheel hub and frame forks is further improved so as to play more practical benefits.

SUMMARY OF THE INVENTION

The main object of this invention is to provide a wheel spindle of the bicycle, whereby the wheel's rolling becomes smooth and steering capability of the bicycle is remarkably increased. In view of the shortcomings found in prior art, special material is used to make the wheel spindle of the present invention so as to allow the wheel spindle to have high elasticity with slight elongation-contraction structure. In this case, the special material is a high rigidity material, the rigidity of which is more than that required on the wheel spindle, so that no slight elongation-contraction effect is found. Nevertheless, the high rigidity material has fatigue endurance. Hence, machining process is conducted on the wheel spindle to reduce its rigidity and thus to increase its elasticity. In this manner, the wheel spindle is consistent with the high elasticity with slight elongation-contraction principle.

The above object and advantages of the wheel spindle of the present invention can be realized by the following technique.

The wheel spindle of the bicycle is inserted in wheel hub so as to fix the wheel body. The wheel spindle, made by rigid titanium alloy, has a plurality of recessed grooves provided around the circumference of the spindle and extended along the axial direction. By providing the recessed grooves, rigidity of the wheel spindle is reduced so as to increase its elasticity. This results in high elastic force with slight elongation-contraction, whereby the wheel body can roll to move smoothly so as to remarkably increase the steering capability of the bicycle.

Furthermore, the proportion between the area of the recessed grooves and the area of the wheel spindle is determined such that the cross sectional area of the recessed grooves is 10%~35% of the total cross sectional area of the wheel spindle, and the length of the recessed grooves is 55%~90% of the total length of the wheel spindle.

DETAILED DESCRIPTION OF PREFERRED EMBODIMENT

The objects, the technical contents and the expected effect of the present invention will become more apparent from the detailed description of the preferred embodiments in conjunction with the accompanying drawings.

Figure 1:
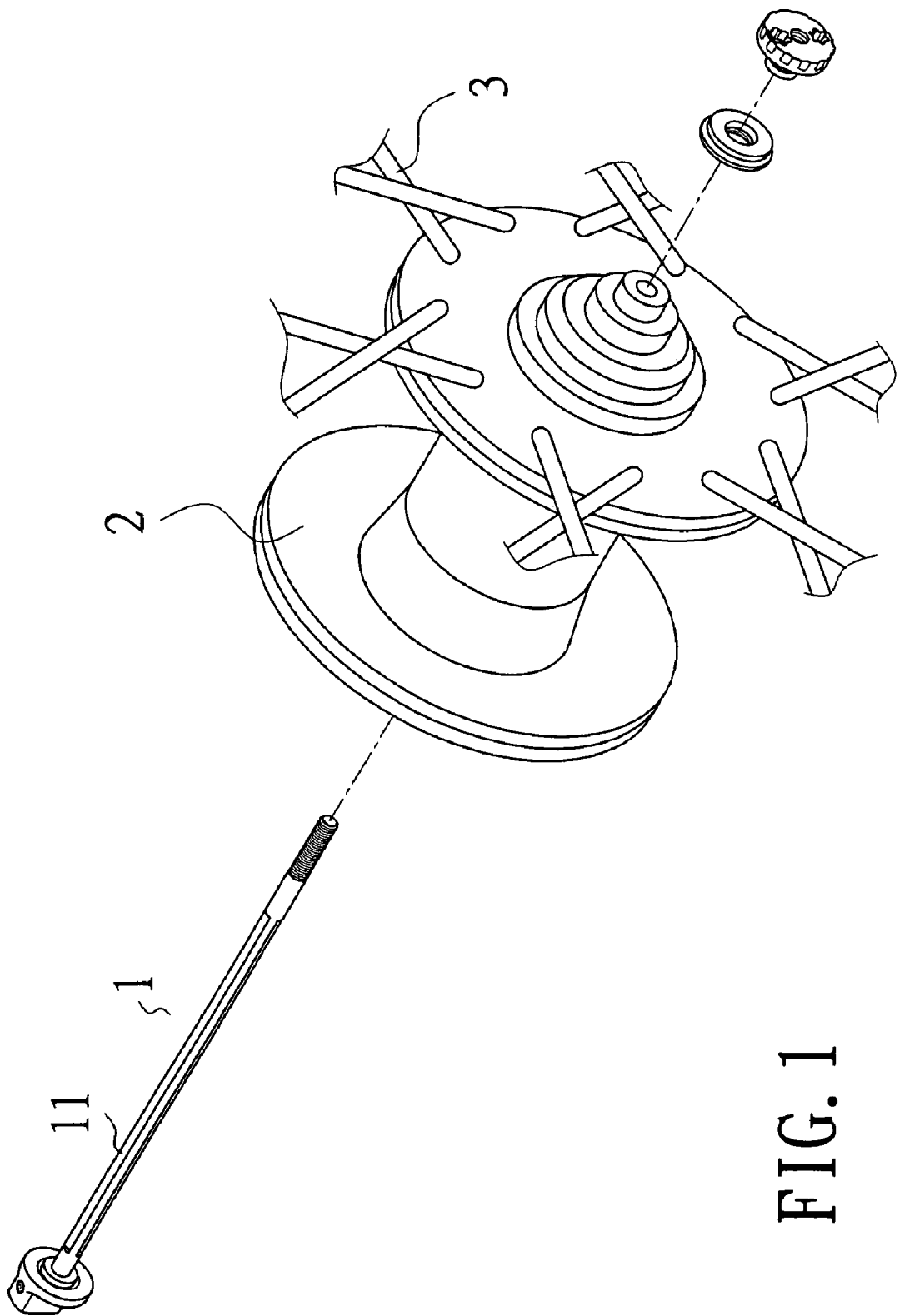
FIG. 1 is a perspective exploded view showing the wheel spindle structure of the present invention.
Figure 2:
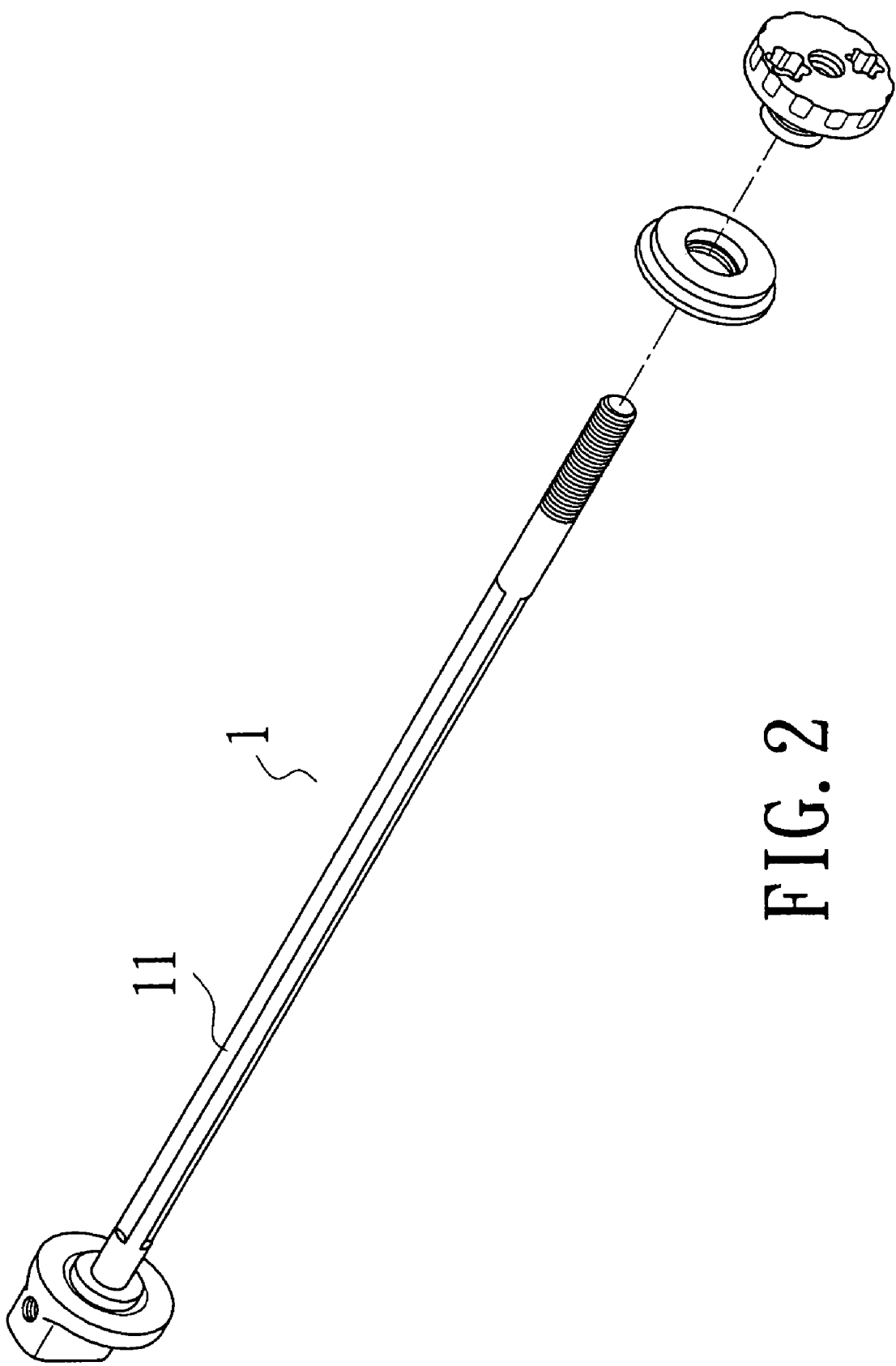
FIG. 2 is another perspective exploded view showing the wheel spindle structure of the present invention.
Figure 3:
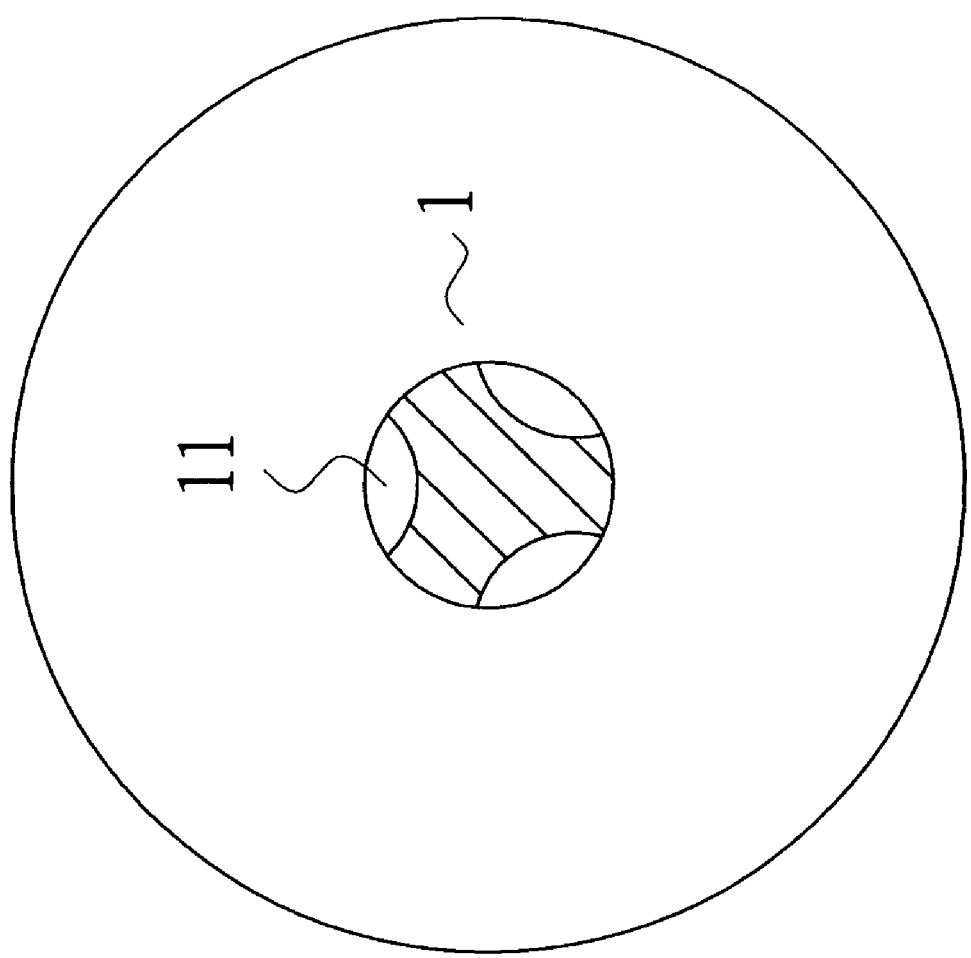
FIG. 3 is a sectional schematic view showing the wheel spindle structure of the present invention.

FIGS. 1 to 3 are perspective exploded and sectional schematic views showing the wheel spindle structure of the bicycle of the present invention. Wheel spindle (1) is inserted in wheel hub (2) so as to fix wheel body (3). The wheel spindle (1), made by rigid titanium alloy, has a plurality of recessed grooves (11) provided around the circumference of the spindle (1) and extended along the axial direction. In an embodiment, three recessed grooves (11) having a round concave arc-shaped cross section are provided on the wheel spindle (1), as shown in FIG. 3. The recessed grooves (11) have different proportional variation according to the type of bicycle such as a racing bicycle or mountain bicycle, or a front suspension or rear suspension bicycle. Generally, the cross sectional area of the recessed grooves (11) is 10%~35% of the total cross sectional area of the wheel spindle (1), and the length of the recessed grooves (11) is 55%~90% of the total length of the wheel spindle (1).

In this way, the rigidity of the wheel spindle is reduced so as to increase its elasticity by the arrangement of the recessed grooves (11). This results in high elastic force with slight elongation-contraction, whereby the wheel body (3) can roll to move smoothly so as to remarkably increase the steering capability of the bicycle.

Figure 4:
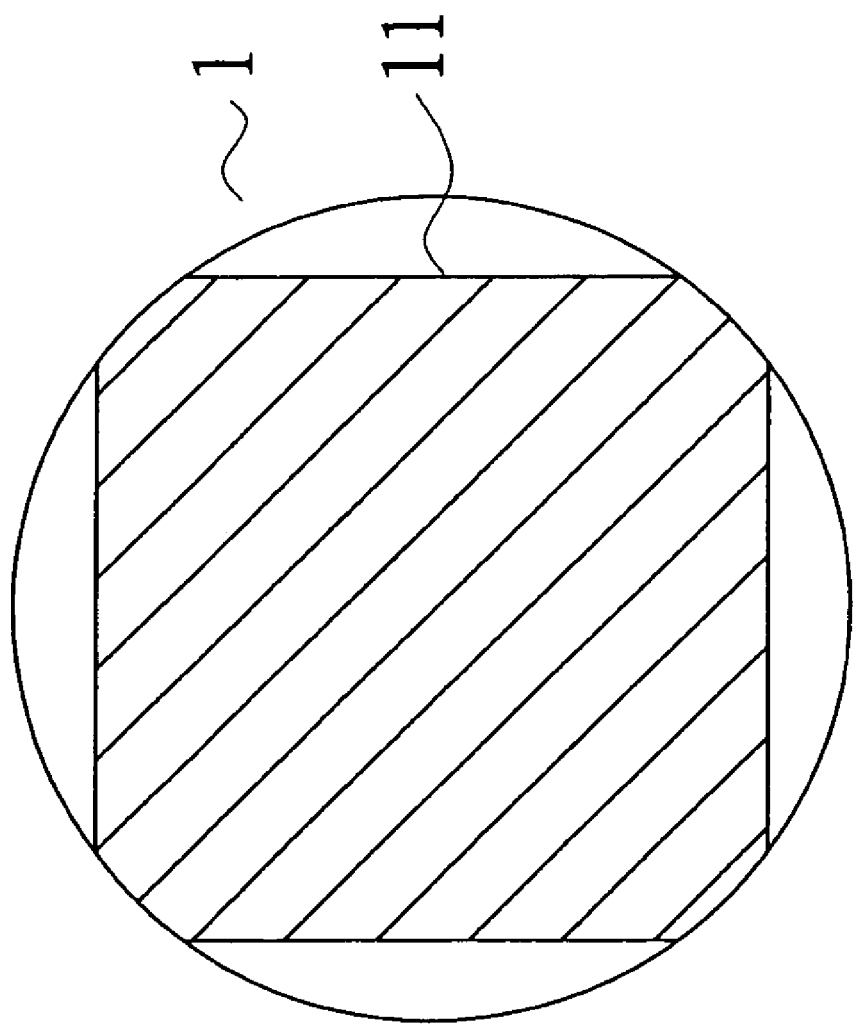
FIG. 4 is a sectional schematic view showing an embodiment of the wheel spindle structure of the present invention.
Figure 5:
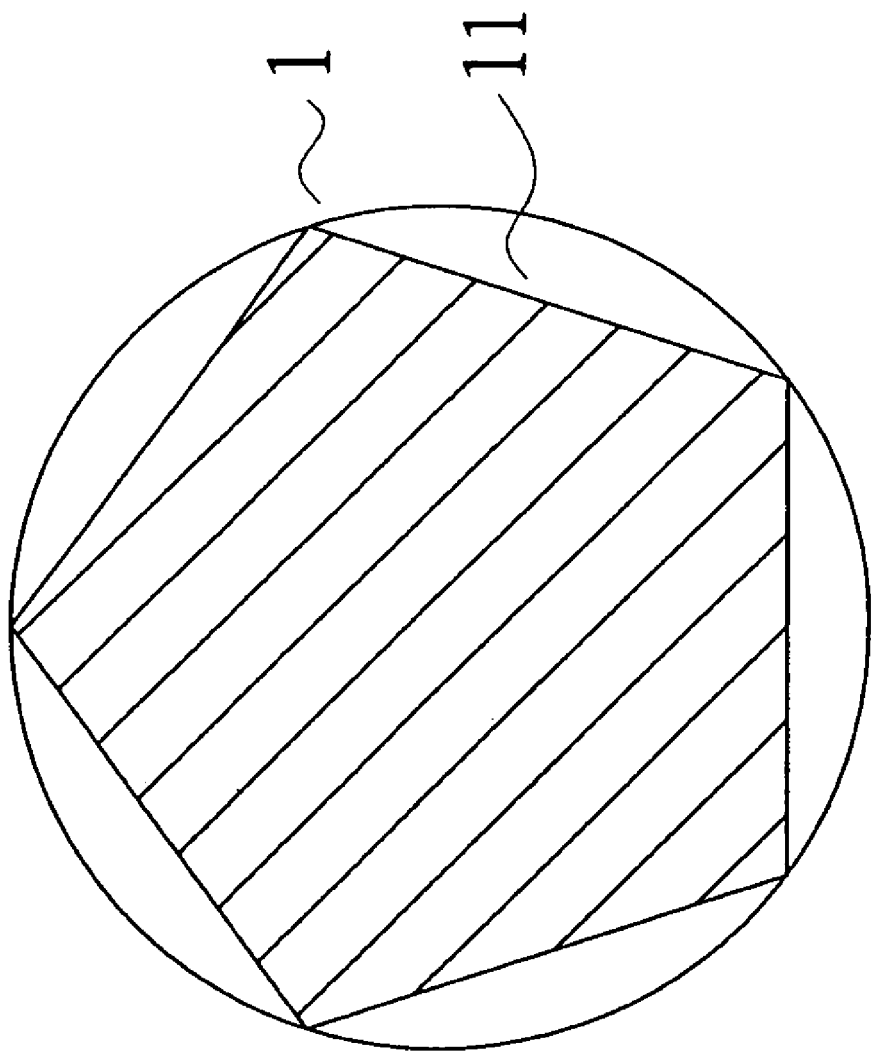
FIG. 5 is a sectional schematic view showing another embodiment of the wheel spindle structure of the present invention.
Figure 6:
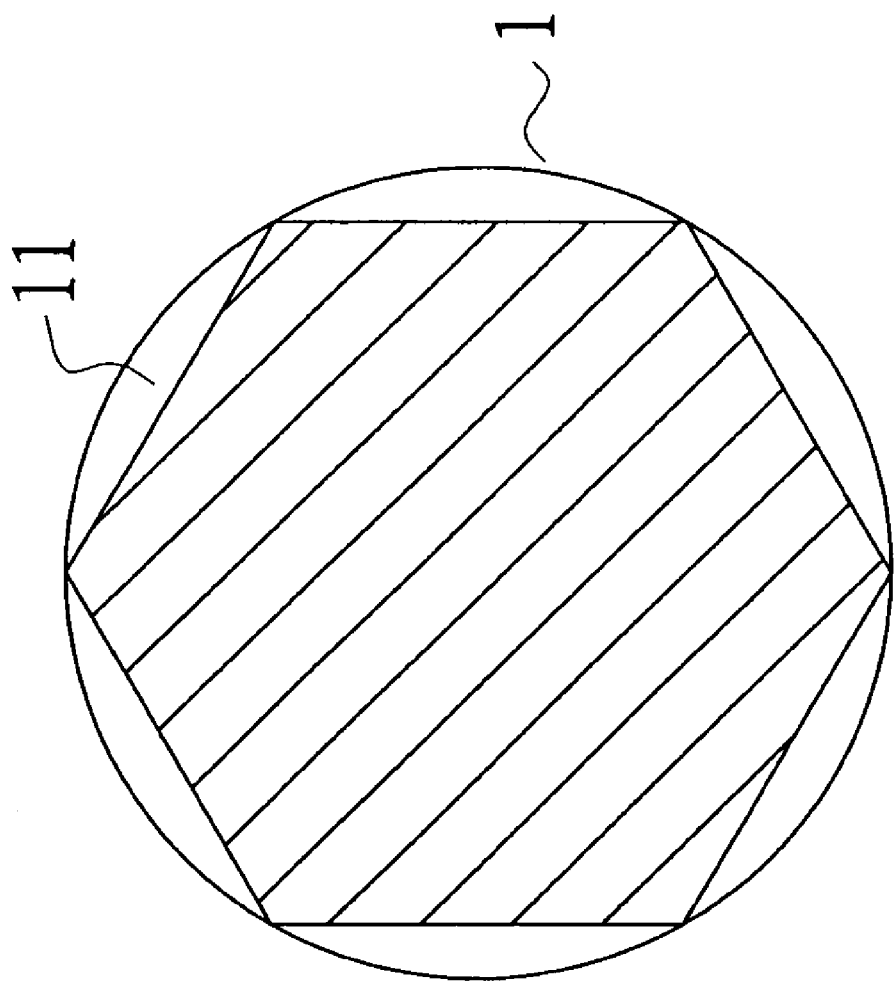
FIG. 6 is a sectional schematic view showing still another embodiment of the wheel spindle structure of the present invention.
Figure 7:
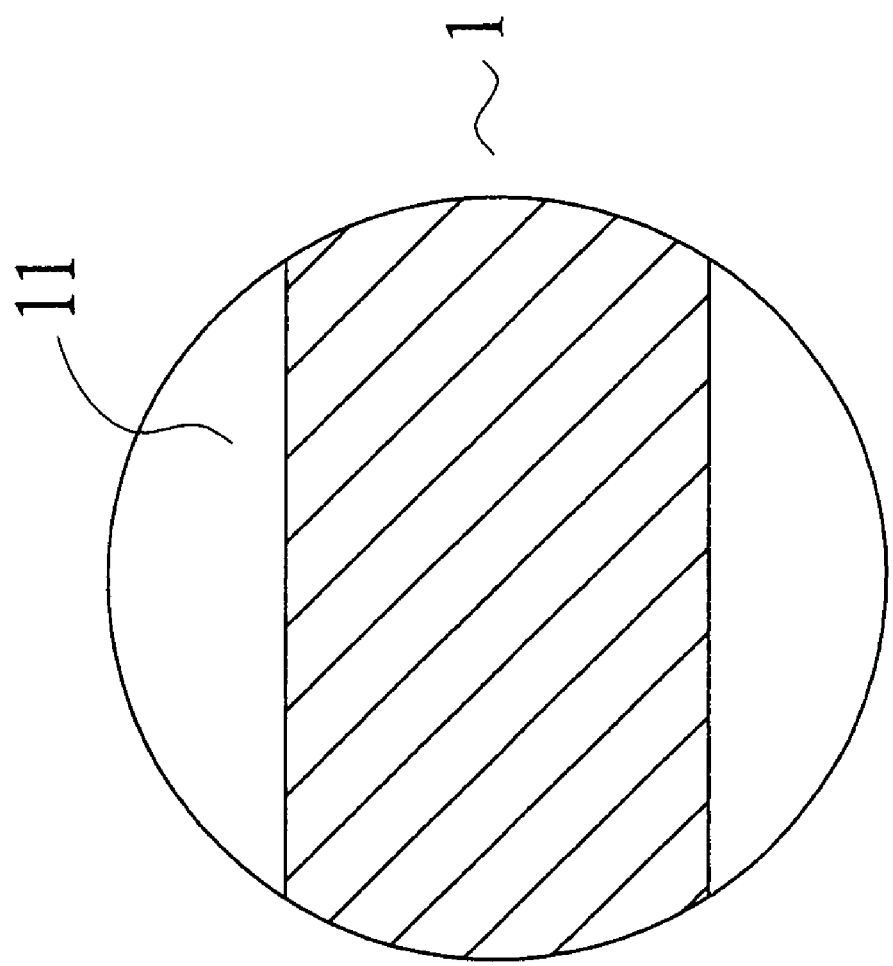
FIG. 7 is a sectional schematic view showing yet another embodiment of the wheel spindle structure of the present invention.
Figure 8:
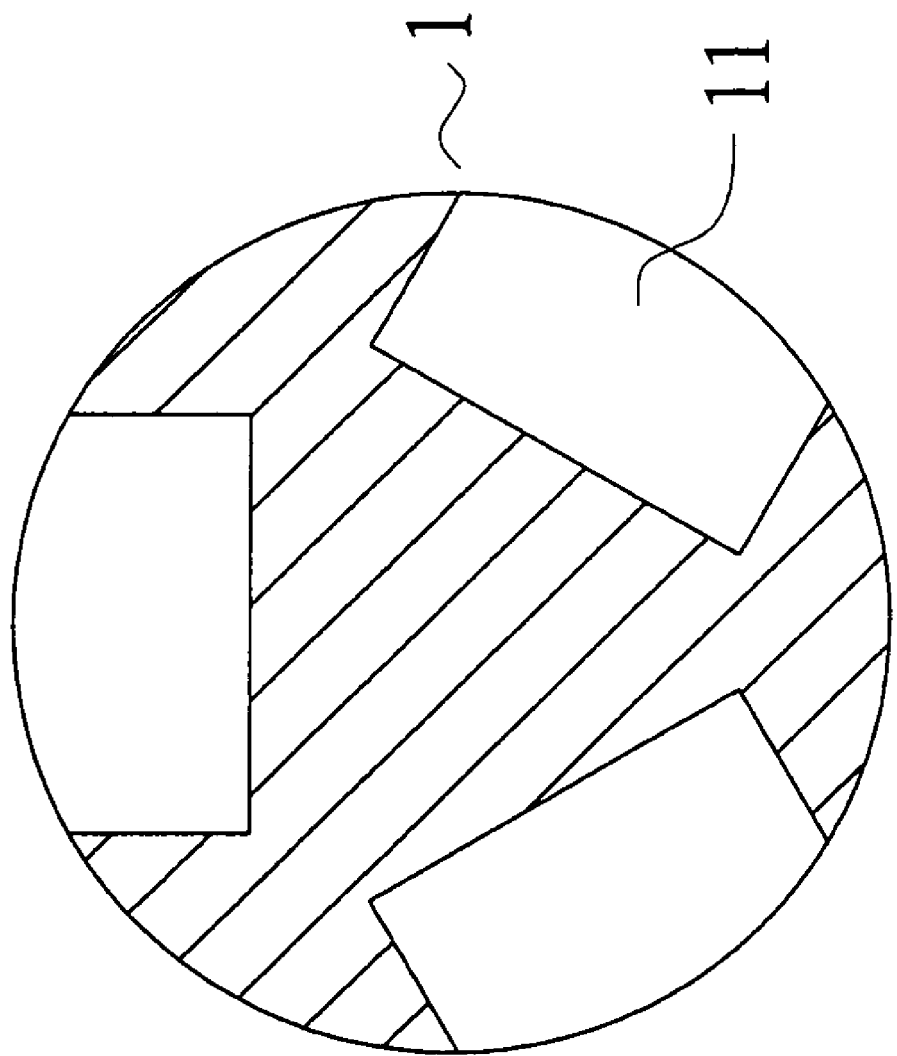
FIG. 8 is a sectional schematic view showing still another embodiment of the wheel spindle structure of the present invention.
Figure 9:
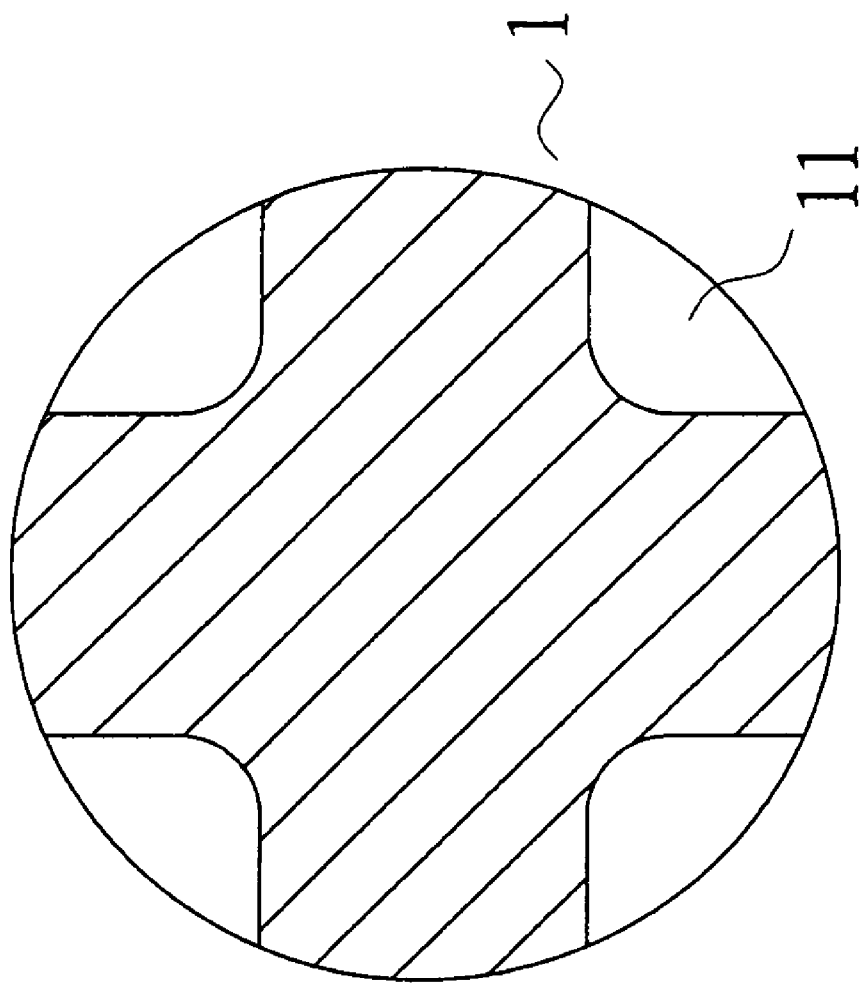
FIG. 9 is a sectional schematic view showing yet another embodiment of the wheel spindle structure of the present invention.

FIGS. 4 to 6 are sectional schematic views showing different embodiments of the wheel spindle of the bicycle of the present invention. As shown in these figures, the cross section of the wheel spindle (1) having recessed grooves (11) therein can be a tetragon, a pentagon or a hexagon, i.e., the wheel spindle (1) is machined to have 4 to 6 straight recessed grooves (11) therein such that the cross section of the wheel spindle (1) is formed as a tetragon, a pentagon or a hexagon respectively in each case. Alternatively, two of the recessed grooves (11) are formed in the wheel spindle (1) each defining a straight line, as shown in FIG. 7, such that the wheel spindle in cross section of the wheel spindle (1) is forms rectangle with two curved sides. Still further, the wheel spindle (1) may include three of the recessed grooves (11) each defining a straight line as shown in FIG. 8, or four of the recessed grooves (11) each having arc corners as shown in FIG. 9, the wheel spindle (1) in cross section forms a cross shape.

The abovementioned embodiments or drawings are not intended to restrict the product aspect, structure or usage mode of the present invention. Various modifications and variations can be made without departing from the spirit and scope of the present invention, as set forth in the appended claims.

Based on the foregoing element constitution and embodiment description, the wheel spindle of the bicycle of the present invention has the advantages set forth below when comparing with prior art.

1. In the wheel spindle structure of the present invention, the wheel spindle having high elastic force with slight elongation-contraction is achieved by providing grooves enabling to increase elasticity on the wheel spindle. Thereby, the wheel body can roll to move smoothly so as to remarkably increase the steering capability of the bicycle.

2. In the wheel spindle structure of the present invention, the recessed grooves can be subjected to variation on dimensional proportion according to the type of bicycle such as a racing or mountain bicycle, or front suspension or rear suspension bicycle so as to be adapted to diversified market demand of the bicycle.

3. In the wheel spindle structure of the present invention, accompanying with the stress and deformation of the bicycle frame and the front fork in cooperation with the displacement of axle point or center point of circle, the wheel spindle conducts slight elongation-contraction so as to remarkably reduce the resonance coming together with rolling in a damper-like manner. Thereby, the wheel body can roll to move smoothly so as to remarkably increase the steering capability of the bicycle.

Summing up above, the embodiment of the present invention can reach anticipated effect, and the specific configurations disclosed herein have yet not found in the prior art of the same category of product, even has not been opened to the public before application.

What is claimed is:

1. A wheel spindle structure of a bicycle, in which the wheel spindle is made of rigid titanium alloy and is inserted to rotatably support a wheel hub so as to retain a wheel body, the wheel spindle having a longitudinally extended body with threads formed in an end portion thereof and a plurality of longitudinally extended recessed grooves formed therein and spaced around the circumference of the wheel spindle, a cross sectional area of the recessed grooves being selected from a range of 10%~35% of the total cross sectional area of the wheel spindle body and a length of the recessed grooves being selected from a range of 55%~90% of the total length of the wheel spindle to provide an elasticity of the wheel spindle to correspond to a type of the bicycle.

2. The wheel spindle structure as claimed in claim 1, wherein the wheel spindle body includes four of the recessed grooves therein each defining a straight line, wherein the wheel spindle body in cross section forms a tetragon having rounded corners.

3. The wheel spindle structure as claimed in claim 1, wherein the wheel spindle body includes four of the recessed grooves therein, wherein the wheel spindle body in cross section forms a cross shape.

4. The wheel spindle structure as claimed in claim 1, wherein the wheel spindle body includes five of the recessed grooves therein each defining a straight line, wherein the wheel spindle body in cross section forms a pentagon.

5. The wheel spindle structure as claimed in claim 1, wherein the wheel spindle body includes six of the recessed grooves therein each defining a straight line, wherein the wheel spindle body in cross section forms a hexagon.

6. The wheel spindle structure as claimed in claim 1, wherein the wheel spindle body includes two of the recessed grooves therein each defining a straight line, wherein the wheel spindle body in cross section forms a rectangle with two curved sides.

7. The wheel spindle structure as claimed in claim 1, wherein the wheel spindle body includes three of the recessed grooves therein each defining a square shape.

* * * * *